May 4, 1965  MOTOYUKI KOGA  3,181,763
SOLDERING IRON
Filed Dec. 6, 1961
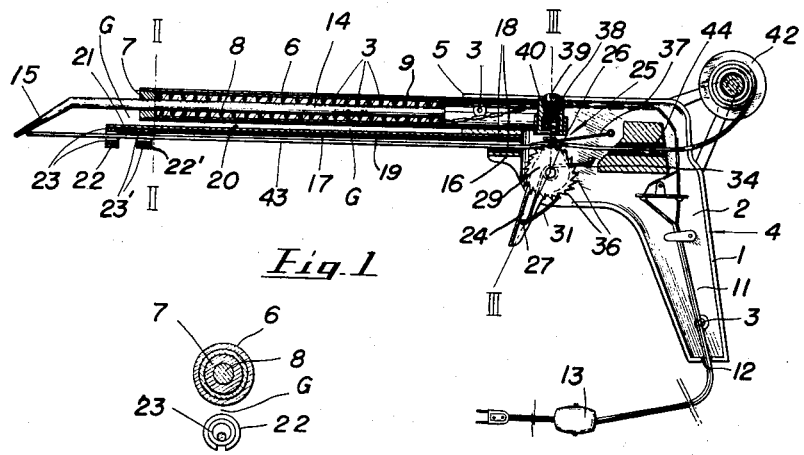
Fig. 1
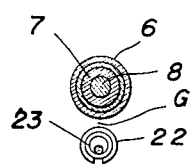
Fig. 2
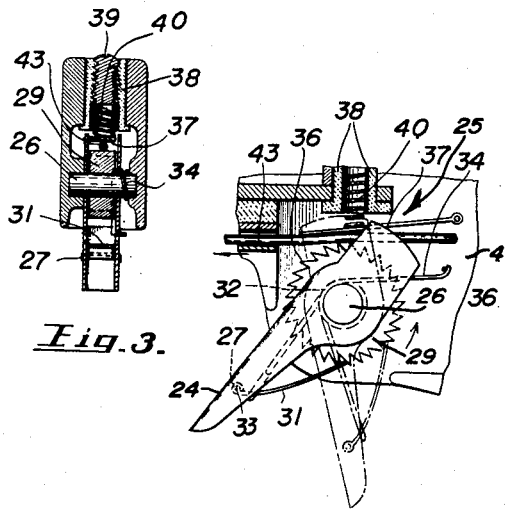
Fig. 3
Fig. 4
INVENTOR.
MOTOYUKI KOGA
BY
Toulmin & Toulmin
Attorneys United States Patent Office 3,181,763
Patented May 4, 1965

3,181,763
SOLDERING IRON
Motoyuki Koga, 966 4-chome, Shimo-Meguro,
Meguro-ku, Tokyo, Japan
Filed Dec. 6, 1961, Ser. No. 157,414
Claims priority, application Japan, Sept. 6, 1961,
36/45,060, 36/45,061, 36/45,062
2 Claims. (Cl. 228—53)

The present invention relates to electric soldering irons of the type which employs heating wire, whereby metallic solder or resinous solder such as polyamide resin is melted, and relates more particularly to a soldering iron in which stringy solder is used.

It has been common practice to employ a soldering iron which is operated by one hand in order to remove the inconvenience of operating the same by both hands. However, such soldering iron is explained by the fact that solder is previously melted in the inside of the soldering iron and thereafter drawn out under melted condition. Therefore, unless the remaining melted solder in the soldering iron becomes exhausted, it hardens again and when it is re-heated in next use, the solder is inclined to lose its cohesive power. This is more severely experienced when paste-containing solder is employed. The present soldering iron has been invented with a view to removing the above defects.

The present soldering iron gives the appearance of a pistol and comprises a heating rod which is heated by heating wire and forms the muzzle of the pistol-shaped soldering iron, said heating rod being bent downward at the forward portion. On the other hand, stringy solder previously wound up is unwound and advanced forward under the heating rod almost in parallel thereto by a forwarding gear which is mechanically connected with the trigger of the soldering iron. The forward end of the stringy solder becomes confronted with the forward end of the heating rod with a narrow space, as it advances. By adequately pulling the trigger for operating the gear, certain quantity of the solder, depending upon the frequency of the pulling operation of the gear, is further advanced and touched to the forward end of the heating rod.

An object of the present invention is to provide a pistol-shaped soldering iron in which, by the action of a forwarding gear mechanically connected with a trigger, stringy solder is advanced and touched to the forward end of a heating rod which is bent downward at the forward portion, thus enabling a desired quantity of the solder to be melted immediately before the soldering operation.

Another object of the present invention is to provide a guiding shelter which is so located between the heating rod and the passage of the solder that the solder will not be futilely softened or melted by the radiant heat from the heating rod.

Another object of the present invention is to provide a ratchet wheel which is handled by the pulling operation of the trigger, and which directs the solder to the front portion of the soldering iron, thus effecting the delicate adjustment of the solder to be melted, and enabling the soldering iron to be operated by one hand.

The invention will be more easily understood from the following detailed description taken in connection with the accompanying drawing, in which FIG. 1 is a longitudinal sectional view illustrating a soldering iron made in accordance with the present invention;

FIG. 2 is an enlarged sectional view taken on the line II—II of FIG. 1;

FIG. 3 is an enlarged sectional view taken on the line III—III of FIG. 1;

FIG. 4 is a partially enlarged view illustrating ratchet gear shown in FIG. 1.

Referring to the drawing, numeral 4 indicates a main body made of suitable synthetic resins or like material, which is constructed by joining two symmetrical elements 2 by means of screws (not shown) which are screwed into holes 3, said symmetrical elements having edge portions 1 which are made thicker than other parts of the elements, so as to form a space sufficient for keeping other component parts in the body 4 when they are put together. A barrel 6 made of aluminum or like material is fixedly supported by and extends from the upper opening 5 of the body, thus forming the muzzle portion of the pistol-shaped soldering iron. A heating rod 8 made of copper is partly inserted into the barrel 6 through a metallic holder 7 fitted in the barrel at the forward end. Between the heating rod 8 and the barrel 6 is provided a heating element 9 such as Nichrome wire which is insulated owing to the provision of an insulating material such as mica. The conducting wires which supply the heating rod with an electric current are led to the opening 5 through a tail opening 12 provided at the bottom of the grip 11, and are connected with an attachment plug via a switch 13 at the outer end thereof, the conducting wires being covered with porcelain tubes. The heating rod 8 projects from the forward end of the barrel 6 and comprises a straight portion 14 and a tapered forward portion 15 which is bent slopewise and made flat at its side closer to the body 4. Closely below the upper opening 5 is provided a lower opening 16 through which the cylindrical portion 18 formed at the rear end of a guiding shelter 17 is inserted. The guiding shelter 17 is made semicircular in cross section and whose rear portion 20 is confronted with the heating rod 8 so as to form a parallel space G. On the forward portion 21 of the guiding shelter are provided two annular links 22, 22' which are fitted with heat-resisting porcelain tubes 23, 23'. The annular link 22, in other words, the forward end of the guiding shelter 17, is confronted with the tapered forward portion 15 of the heating rod with the narrow space of G.

As clearly illustrated in FIG. 4, a trigger 24 which constitutes a part of feed gear 25 for advancing stringy solder is provided. The feed gear 25 comprises the trigger 24 pivotally connected with an axle 26 which is secured on the body 4, a ratchet wheel 29 pivotally connected with said axle 26 and located between the side plates of the body, a click 31 one end of which being pivotally connected at 27 with the trigger, a spring 34 having a ring portion 32 in the middle thereof, stopped on the body at one end, and supporting the click 31 as at 33 at the opposite, said ring portion being fitted on the axle 26, a pressing plate 37 separately provided above the ratchet 36 circumferentially notched on the ratchet wheel 29, and which is pivotally secured on the body at one end, an adjusting bore 38 provided above the axle 26 so as to intersect the center line of the barrel 6, and a pressing element having a coiled spring 40 and an adjusting screw 39 movably threaded in the adjusting bore, said coiled spring 40 being located underneath said adjusting screw 39.

Owing to the provision of the spring 34, the click 31 is forcedly touched to the ratchet 36 at the bottom portion of the ratchet wheel 29. Stringy solder 43 wound on a reel 42 is led to the annular links 22, 22' via a guiding passage 44 and the middle portion 19 of the guiding shelter 17 through between the ratchet 36 and the pressing plate 37. By adjusting the elasticity of the coiled spring 40 through the screwing operation of the adjusting screw 39, the solder is pressed onto the ratchet 36 by the pressing plate 37. The solder in such condition is readily advanced by the pulling operation of the trigger 24 and melted when it touches on the flat side of the tapered forward portion 15 of the heating rod. In the pulling operation, the trigger 24 tends always to be restored to its original state due to the transverse stability of the spring 34. However, in this case, when the trigger is automatically pulled back, the ratchet wheel 29 will not move, as the click 31 frees itself from the ratchet 36.

The present invention may be embodied in other specific methods and forms without departing from the spirit thereof. It is therefore desired that the present embodiment be considered in all respects as illustrative and not restrictive, reference being had to the appended claims rather than to foregoing description to indicate the scope of the invention.

What is claimed is:
1. A soldering iron operative by one hand, comrpising a pistol-shaped main body, a barrel fitted in the forward opening at one end and extending therefrom, a heating rod fitted in and extending from the barrel and bent slopewise at its forward portion, a guiding shelter fitted in a lower opening of said body and extending therefrom in parallel with the barrel, said guiding shelter confronting with the forward portion of the heating rod, and a feed gear whereby stringy solder is advanced, said feed gear comprising a trigger pivotally mounted on an axle which is secured to the body, a ratchet wheel pivotally mounted on said axle, a click pivotally connected with the lower portion of the trigger at one end and adapted to engage with the ratchet of the wheel, a longitudinally extending pressing plate positioned over the ratchet with one end pivotally secured to the body on a transversely extending pivot rearwardly of said ratchet and with its other end being free and extending forwardly of said ratchet, an adjusting bore vertically provided on the body over said pressing plate so that it will intersect with the center line of the barrel, an adjusting screw movably threaded into the adjusting bore, and a coil spring positioned between the screw and the pressing plate.

2. The invention as defined in claim 1, wherein the trigger comprises spaced side plates and wherein the ratchet is positioned between said side plates.

References Cited by the Examiner
UNITED STATES PATENTS 2,952,763 9/60 Gustafsson _____ 133—109 XR
2,995,099 8/61 Kowalczyk _____ 113—109
3,097,286 7/63 Luke _____ 113—109

CHARLES W. LANHAM, Primary Examiner.
JOHN F. CAMPBELL, MICHAEL V. BRINDISI,
Examiners.